United States Patent Office 3,458,625
Patented July 29, 1969

3,458,625
RUMINANT FEEDING
William L. Ensor, Wauconda Township, Lake County, Ill., and Joseph C. Shaw, Rome, Italy, assignors to The Quaker Oats Company, Chicago, Ill., a corporation of New Jersey
No Drawing. Continuation-in-part of applications Ser. No. 37,093, June 20, 1960, and Ser. No. 126,873, July 26, 1961. This application Apr. 22, 1963, Ser. No. 274,843
Int. Cl. A61k 27/00; A23k 1/16
U.S. Cl. 424—95                2 Claims This application is a continuation-in-part of our previous applications, Ser. No. 37,093 filed June 20, 1960 and Ser. No. 126,873 filed July 26, 1961.

This invention relates to methods of feeding ruminants and to feed compositions and methods of preparing same for use in said feeding methods.

The desirability of accelerating growth and fattening of meat-producing ruminating animals such as cattle and sheep utilizing reduced amounts of feed is, of course, obvious from an economic standpoint. Proper feeding of the animals is very important with respect to the quality of the meat obtained, particularly the juiciness and flavor thereof. Increasing the growth rate of growing and/or fattening ruminants is desirable to produce larger animals which can be marketed at an early age. In order to stimulate growth and fattening it has been suggested to feed these ruminants high levels of grain. In fact, large numbers of cattle and sheep are raised for a time on ranges in Western states and then marketed in areas where grains are more readily available where the animals are further fattened to an extent suitable for slaughtering. Results reported in the literature such as, for example, experiments reported in Morrison's Feeds and Feeding, 22nd edition, show that lambs fattened on unusually high grain rations gained on the average about 0.34 pound per day and required 805 to 1032 pounds of feed to produce 100 pounds of weight gain. These heavy grain rations do not constitute a satisfactory solution to the problem of stimulating growth and fattening of these ruminants.

Similarly, it has been suggested to incorporate in the diet of these ruminants to increase energy, fats as the natural plant or animal triglycerides as well as hydrogenated fats and oils. While incorporation of substantial amounts of these fats into ruminant feeds has the advantage of reducing the dustiness of mixed feeds, no significant nutritional advantages are realized. Furthermore, it has not proven economically feasible to add animal or plant triglycerides to feeds for growing or fattening ruminants.

In the case of lactating dairy cows, improvement in milk production is the desiderata. It is well known that milk production increases gradually at the initiation of lactation following parturition with the maximum peak of the lactation occurring approximately 6–8 weeks after initial lactation, but then steadily decreases during the post-peak lactation period. The entire lactation period of dairy cows normally consists of approximately 305 days. Various studies of this phenomenon have been reported in the scientific literature. Thus, for example, in an article by T. E. Woodward in the "Journal of Dairy Science," volume 28, page 209, 1945, it is reported that analysis of 15,442 lactations showed that the average lactation curve decreases at a rate of about 7.4% per month. Milk production of high producing cows decreased at a slower rate (approximately 6.6% per month) than that of low producing cows (approximately 8.4% per month).

In order to increase milk production and/or to minimize the normal decrease in milk production during the lactation period, it has been proposed heretofore to feed the cows along with the normal daily feed ration, high levels of fat as the natural plant or animal triglycerides as well as hydrogenated fats and oils. However, the feeding of such natural plant or animal triglycerides and hydrogenated fats and oils does not significantly improve milk production over and above that expected from large increases in caloric intake.

It is therefore a major object of the invention to provide a method of feeding ruminants to improve growth and milk production thereof.

It is a further object of this invention to provide a method of feeding ruminants to improve growth and milk production thereof and at the same time improve feed utilization efficiency of the ruminants.

It is a specific object of this invention to provide a method of feeding growing and/or fattening meat-producing ruminants to increase significantly the rate or efficiency of weight gain and to improve the carcass grade of the animals.

It is another specific object of the invention to provide a method of feeding lactating dairy cows to improve milk production thereof while maintaining or increasing the butterfat content of the milk.

A further object of the invention is to provide feed compositions and methods of preparing the same which, when fed to ruminants, affords the foregoing advantages.

In accordance with this invention these objects are accomplished by orally administering to ruminant animals critical levels of unsaturated fatty acid materials. The unsaturated materials fed according to this invention range from mono-ethenoid to hexa-ethenoid type compounds and are selected from the group consisting of free fatty acids having at least 14 carbon atoms in the molecule such as, for example, myristoleic acid, palmitoleic acid, gadoleic acid, oleic acid, linoleic acid, linolenic acid, arachidonic acid, clupanodonic acid, eicosapentenoic acid, docosahexenoic acid; unsaturated alcohols of these acids and lower alkyl esters of these acids containing from 1 to 4 carbon atoms in the alkyl group. Mixtures of specific unsaturated fatty acids can also be employed as well as mixtures of unsaturated compounds derived from marine, animal and plant or vegetable oils such as the hydrolyzed plant oils from soya bean, cottonseed, linseed, sunflower, safflower, corn, rice and perillo; hydrolyzed marine oils from such sources as menhaden, herring, red fish, white fish, shark, codfish, whale; hydrolyzed animal fats containing substantial amounts of unsaturated fatty acids such as fats derived from swine and poultry.

The amount of the unsaturated materials fed to the ruminants has been found critical with respect to obtaining optimum improvement in acceleration of growth and fattening of the animals, efficiency of feed utilization and improvement in milk production of the lactating ruminants. Specifically it has been found that the desired advantages are achieved when the unsaturated materials are fed to the animals in amounts to provide at least about 0.7 iodine value unit per pound of feed intake. Preferably the unsaturated materials are employed in amounts to provide at least about 1 iodine value unit per pound of feed intake. The unsaturated materials can and frequently are fed in larger amounts to provide a number of iodine value units appreciably greater than the specified minimum. The optimum amount of the unsaturated materials to employ can be determined readily taking into consideration the dietary habits of the ruminant animals and the type of ration feed.

Iodine value unit can be defined as the grams of iodine taken up by 1 gram of unsaturated compound. For example, 1 gram of the mono-ethenoid oleic acid takes up 0.90 gram of iodine and accordingly in accordance with the preferred level of feeding a minimum of about 1 gram of oleic acid is employed per pound of feed fed to the ruminants.

Obviously, the greater degree of unsaturation of the unsaturated compounds fed, the lesser the amount of the compound need be employed in order to provide the necessary iodine value units. When the unsaturated compounds are employed in amounts appreciably below the specified minimum neither the rate of weight gain, feed utilization efficiency or milk production are significantly improved over that obtained with the normal base ration alone.

A typical analysis of a marine oil (menhaden fish oil) obtained by gas chromatography is as follows:

| Fatty Acids | | No carbons, double bond | Percent by weight |
|---|---|---|---|
| Systematic name | Common name | | |
| Dodecanoic | Lauric | 12 | 0.05 |
| Tetradecanoic | Myristic | 14 | 15.28 |
| Tetradecenoic | Myristoleic | 14-1 | 0.05 |
| Pentadecanoic | | 15 | 0.35 |
| Pentadecenoic | | 15.1 | 0.05 |
| Hexadecanoic | Palmitic | 16 | 16.72 |
| Hexadecenoic | Palmitoleic | 16-1 | 12.00 |
| Hexadecenoic | | 16-2 | 1.50 |
| Octadecanoic | Stearic | 18 | 2.95 |
| Hexadecenoic | | 16-3 | 1.50 |
| Octadecenoic | Oleic | 18-1 | 11.51 |
| Octadecadienoic | Linoleic | 18-2 | 2.10 |
| Hexadecatetraenoic | | 16-4 | 1.40 |
| Octadecatrienoic | Linolenic | 18-3 | 0.30 |
| Eicosanoic | Arachidic | 20 | 0.30 |
| Eicosenoic | | 20-1 | 3.00 |
| Octadecatetraenoic | | 18-4 | 3.25 |
| Docosanoic | Behenic | 22 | 0.05 |
| Docosenoic | | 22-1 | 1.20 |
| Eicosatetraenoic | | 20-4 | 1.35 |
| Eicosapentaenoic | | 20-5 | 14.00 |
| Tetracosenoic | | 24-1 | 1.00 |
| Docosatetraenoic | | 22-4 | 0.25 |
| Docosapentaenoic | Clupanodonic | 22-5 | 2.25 |
| Docosahexaenoic | | 22-6 | 7.59 |

Other marine oils generally contain the same fatty acids as above with minor variations in the proportions thereof and/or inclusion of small amounts of other long chain fatty acids. In each case the iodine value unit of the hydrolyzed marine oil can be readily determined thereby permitting the use thereof in proper amounts in accordance with the invention.

The feeding of the unsaturated compounds according to this invention produces favorable physiological changes in the ruminant resulting in increased energy for the ruminant. In the case of cattle and sheep the increased energy results in acceleration of the rate of gain in body weight and better finishing. In lactating animals the result is a stimulation in lactational drive thus resulting in greater total milk production for the entire lactation period. The feeding of the unsaturated compounds at the proper levels during the latter part of the lactation period results in a sustained level of milk production. For all ruminants the greater production of energy resulting from the feeding of the unsaturated compounds of this invention is above the actual caloric value of the ingested unsaturated compounds. Furthermore the feeding of the unsaturated compounds according to this invention improves the appetite of the animal and causes a marked change in the mobilization and deposition of fat with consequent improvement in the market grade of the finished animal.

In preferred embodiments of the invention the unsaturated materials are orally administered in the form of novel feed compositions. The feed compositions are prepared by adding to the normal or basal feed ration of a ruminant one of the aforementioned unsaturated materials or mixtures of two or more of the named unsaturated materials in an amount to provide at least 0.7 iodine value unit per pound of the total daily feed. The basal feed ration of ruminants can be comprised of roughages, such as hay, silage, ground corn cobs, cottonseed hulls, grains (including corn, oats and barley) or grain by-products such as hominy feed, wheat middlings, supplemental protein ingredients such as soybean meal, cottonseed meal or non-protein nitrogen containing compounds such as urea, mineral supplements providing calcium, phosphorus or trace minerals, and vitamin supplements such as vitamins A and D.

In a second embodiment the unsaturated materials can be fed in the form of a feed concentrate comprised of the unsaturated materials and grains, grain by-products, protein supplements, vitamins and mineral additions, which feed supplement is adapted for feeding with roughage, either separately or mixed together.

In a further embodiment a feed concentrate is provided comprising the unsaturated materials and protein, vitamin and mineral supplement, which concentrate is adapted for mixing or feeding directly with grains and/or roughages. Also, the unsaturated compounds may be incorporated with a nonnutritional carrier, such as vermiculite, or highly absorptive materials such as oat hulls and corn cobs. When the unsaturated compounds are utilized in feed concentrates the amount incorporated therein depends upon the rate at which the feed concentrate is combined with other feed materials to comprise the total feed ration.

The unsaturated compounds which are employed in accordance with the present invention are susceptible to oxidation, resulting in decomposition of the unsaturated materials. When the oxidation has become excessive the iodine value of the unsaturated materials is reduced; however, in some cases, the effectiveness of the unsaturated material is seriously lessened when only partial oxidation has occurred with little or no effect on iodine value. This is perhaps due to the presence of some partial oxidation products in the unsaturated materials. Accordingly, in a preferred aspect of the invention the unsaturated compounds are stabilized against oxidation by the incorporation therewith of oxidation retardants including antioxidants and metal chelating agents. Representative antioxidants which can be utilized include butylated hydroxytoluene (2,6-ditertiary butyl 4-methyl phenol), santoquin (6-ethoxy 2,2,4-trimethyl 1,2-dihydroquinoline), butylated hydroxyanisole (2-tertiary butyl 4-methoxy phenol), and propyl gallate. Particularly good results are achieved with a combination of antioxidants and metal chelating agents, such as citric acid, phosphoric acid and tartaric acid. Generally, the antioxidants and metal chelating agents, if any, are employed with the unsaturated materials in an amount sufficient to prevent oxidative deterioration of the feeds in storage. This, of course, depends upon the conditions and length of storage contemplated and can range from about 200 to 4000 or more parts per million of the unsaturated materials.

The invention and advantages thereof are further illustrated by the following specific examples which are illustrative of the invention but not limitative thereof. In accordance with the United States Department of Agriculture Grading Standards, a lower value for carcass grade reported in these examples indicates a higher quality meat, a rating of 1=prime, 2=choice, 3=good, etc.

EXAMPLE 1

Feeding trials were conducted with steers, employing a mixture of unsaturated fatty acids derived from cottonseed and soybean. The mixture of unsaturated fatty acids (29.7% saturated acids, 24.1% oleic acid, 41.9% linoleic acid, and 4.4% linolenic acid) was fed to a group of steers, with a comparable group of steers serving as a control. The unsaturated fatty acids were stabilized against oxidation with butylated hydroxytoluene. Five percent of the unsaturated fatty acid mixture was incorporated in a protein feed concentrate to supply 24 iodine value units of added unsaturated materials per pound of concentrate. The concentrate was fed at the rate of 3 pounds per head per day. The remainder of the ration was cracked shelled corn, chopped hay and long hay. The control group was also fed a 32% crude protein supplement at the rate of 3 pounds per head per day without the incorporation of the unsaturated fatty acids.

Following is a typical list of ingredients in the protein concentrate used for beef trials: soybean meal, linseed meal, urea, molasses, dehydrated alfalfa meal, defluorinated phosphate, limestone, salt (sodium chloride), vitamin D as D-activated plant sterol, aureomycin, Stilbosol (a commercial preparation of stilbesterol), manganous oxide, ferrous carbonate, cupric oxide, zinc oxide, cobalt carbonate, potassium iodide, and magnesium oxide.

The improvement in performance of growing and/or fattening ruminants with the feeding of the unsaturated materials has been found to be independent of the presence of antibiotics or hormones in the feed. The following results were obtained.

|  | Control | Experimental |
|---|---|---|
| Number of animals | 10 | 10 |
| Average initial wt., lbs | 701 | 703 |
| Average final wt., lbs | 1,107 | 1,141 |
| Average daily gain, lbs | 2.88 | 3.11 |
| Average daily feed intake, lbs | 22.91 | 23.00 |
| Feed per cwt. gain, lbs | 796 | 740 |
| I.V.U. intake per day | 0 | 72 |
| I.V.U. intake per lb. feed | 0 | 3.1 |
| Carcass grade | 2.81 | 2.69 |

The cattle receiving the unsaturated fatty acids gained 0.23 pound per day faster and required 56 pounds less feed per 100 pounds of gain. The carcass grades were also improved, as shown by the grading score of 2.81 for the controls and 2.69 for the treated group.

EXAMPLE 2

Two groups of steers (one control group) were fed for 56 days a diet of cracked shelled corn ad libitum, 3 pounds per day of hay, and 5 pounds per head per day of a pelleted protein supplement. The protein supplement for the experimental group contained a mixture of unsaturated fatty acids from tall oil (53% oleic, 47% linoleic) in an amount to supply 29.9 iodine value units from tall oil fatty acids per pound of concentrate. Butylated hydroxytoluene was employed (200 p.p.m.) to stabilize the unsaturated materials. As can be seen from the data, the cattle receiving the tall oil fatty acids gained 0.46 pound per day more and required 112 pounds less feed for each 100 pounds of gain than the control group.

|  | Control | Experimental |
|---|---|---|
| Number of animals | 10 | 10 |
| Average initial wt., lbs | 678 | 679 |
| Average final wt., lbs | 825 | 852 |
| Average daily gain, lbs | 2.62 | 3.08 |
| Average daily feed intake, lbs | 21.2 | 21.5 |
| Feed per cwt. gain, lbs | 810 | 698 |
| I.V.U. intake per day | 0 | 149.8 |
| I.V.U. intake per lb. feed | 0 | 7.0 |

EXAMPLE 3

Twenty-eight white-faced heifers were allotted to 7 groups of 4 heifers each and were placed on rations providing soybean fatty acids ranging from 1/32 pound per head per day to a high of 3/4 pound per head per day, with 1 group serving as the control group receiving no soybean fatty acids. Heifers were fed a ration composed of 2 pounds of a protein supplement per head per day, fed with ground ear corn and 1.44 pounds of hay per day. Quantities of unsaturated fatty acids in excess of 1/8 pound per head per day were provided by mixing the soybean fatty acids with ground ear corn in the quantity to supply the desired level. The fatty acids were stabilized against oxidation with a combination oxidation retardant comprising butylated hydroxy toluene (300 p.p.m.), santoquin (3000 p.p.m.), citric acid (100 p.p.m.) and phosphoric acid (500 p.p.m.). The feeding test was run for 98 days and the results are shown below.

| Treatment | Grams | No. of animals | Av. initial wt., lbs. | Av. final wt., lbs. | Av. daily gain, lbs. | Av. daily feed intake, lbs. | Feed per cwt. gain | Total I.V.U. intake/day | I.V.U. lb. feed |
|---|---|---|---|---|---|---|---|---|---|
| Control | | 4 | 488 | 710 | 2.26 | 19.92 | 881 | | 0 |
| 1/32 #FA/day | 14.2 | 4 | 488 | 751 | 2.68 | 20.72 | 772 | 17.9 | 0.86 |
| 1/16 #FA/day | 28.4 | 4 | 498 | 763 | 2.70 | 20.75 | 768 | 35.8 | 1.72 |
| 1/8 #FA/day | 56.7 | 4 | 493 | 746 | 2.58 | 20.52 | 795 | 71.6 | 3.49 |
| 1/4 #FA/day | 113.4 | 4 | 503 | 750 | 2.52 | 19.26 | 763 | 143.2 | 7.43 |
| 1/2 #FA/day | 226.8 | 4 | 499 | 756 | 2.62 | 18.96 | 722 | 286.4 | 15.1 |
| 3/4 #FA/day | 340.2 | 4 | 494 | 748 | 2.60 | 18.33 | 705 | 429.6 | 23.4 |

Heifers receiving 0.86 or more of iodine value units per pound of feed gained significantly faster than the control group and required significantly less feed per 100 pounds of gain, thus saving more than 100 pounds of feed per 100 pounds of gain.

To further demonstrate the effective feeding levels of the unsaturated material, 3 groups of 4 heifers each were allotted to an experiment in which 1/64 pound of the same lot of soybean fatty acids and 1/8 pound of soybean fatty acids per head per day were fed.

|  | Control | Experimental 1/64 # SFA Per hd./day | Experimental 1/8 # SFA Per hd./day |
|---|---|---|---|
| No. of animals | 4 | 4 | 4 |
| Av. initial wt., lbs | 740 | 741 | 744 |
| Av. final wt., lbs | 913 | 912 | 944 |
| Av. daily gain, lbs | 2.31 | 2.28 | 2.66 |
| Av. daily feed intake, lbs | 21.78 | 22.40 | 23.47 |
| Feed per cwt. gain, lbs | 944 | 981 | 882 |
| I.V.U. intake per day | 0 | 7.1 | 56.7 |
| I.V.U. intake per lb. feed | 0 | 0.32 | 2.41 |

The heifers receiving 0.32 iodine value units of unsaturated material per pound of feed gained no faster than the control cattle, while those receiving 2.41 iodine value units per pound of feed showed a significant improvement in average daily gain and feed efficiency. It is apparent that the 0.32 iodine value unit intake per pound of feed did not provide marked improvement in rate and efficiency of weight gain.

EXAMPLE 4

Two groups of beef steers of approximately 900 pounds, initial weight were placed on an experimental feeding regime in which they received 2 pounds per head per day of a 32% protein supplement, cracked shelled corn, corn silage and hay. The protein supplement fed to the group receiving unsaturated material contained 30.2 iodine value units per pound of the methyl esters of a mixture of soybean and cottonseed fatty acids stabilized with butylated hydroxytoluene. The cattle were fed for a 105-day feeding period.

|  | Control | Experimental |
|---|---|---|
| Number of animals | 10 | 9 |
| Average initial wt., lbs | 889 | 901 |
| Average final wt., lbs | 1,183 | 1,219 |
| Average daily gain, lbs | 2.80 | 3.03 |
| Average daily feed intake, lbs | 23.18 | 22.92 |
| Feed per cwt. gain, lbs | 828 | 756 |
| I.V.U. intake per day | 0 | 60.4 |
| I.V.U. intake per lb. feed | 0 | 2.6 |
| On foot grade | 2.96 | 2.87 |

The cattle receiving the methyl esters of soybean and cottonseed fatty acids gained 0.23 pound per day faster than the control cattle and required 72 pounds less feed for each 100 pounds of gain.

EXAMPLE 5

Two groups of steers were placed on an experiment comparing the feeding of 1/32 of a pound per head per day of stabilized (BHT) glycerides of animal fat with 1/32 pound of stabilized (BHT—santoquin—citric acid—phosphoric acid) free fatty acids of soybean. The stabilized glycerides of animal fat or the free fatty acids of soybean oil were included in a protein supplement fed at the rate of 5 pounds per head per day along with ground ear corn ad libitum with daily feed intake recorded.

|  | Control | Experimental |
|---|---|---|
| Number of animals | 10 | 10 |
| Average initial wt., lbs | 747 | 747 |
| Average final wt., lbs | 818 | 871 |
| Average daily gain, lbs | 2.39 | 2.60 |
| Average daily feed intake, lbs | 22.65 | 22.68 |
| Feed per cwt. gain, lbs | 949 | 872 |
| I.V.U. intake per day | 0 | 17.9 |
| I.V.U. intake per lb. feed | 0 | 0.8 |

From the data presented in the table it is evident that the cattle receiving the soybean fatty acids providing 0.8 added iodine value units per pound of feed gained at a significantly faster rate than those receiving an equal amount of stabilized animal fat and made more efficient use of the feed consumed. Thus the incorporation of as little as 0.8 iodine value unit from soybean fatty acids per pound of total feed resulted in significantly improved performance.

EXAMPLE 6

A comparison of the value of unsaturated materials of the invention with natural glycerides as metabolic stimulants can be seen in this example.

Two groups of beef steers were placed on a test in which they were fed a complete ration composed of oat mill feed, screenings and dehydrated alfalfa meal as the source of roughage, and including grain, grain by-products, molasses, and mineral and vitamin supplementation. One group received a basal ration with the replacement of 4% oat mill by-product with 4% of stabilized glycerides of animal fat. These steers were fed for an 84-day period on a wintering test in which both groups received the same pounds of feed intake per head per day.

|  | Control | Experimental |
|---|---|---|
| Number of animals | 16 | 16 |
| Average initial wt., lbs | 747.5 | 746.8 |
| Average final wt., lbs | 916.3 | 915.6 |
| Average daily gain, lbs | 2.01 | 2.01 |
| Average daily feed intake, lbs | 24.6 | 24.6 |
| Feed per cwt. gain, lbs | 1,224 | 1,224 |

From the above data it is evident that the cattle receiving the stabilized animal fat performed no better than those on the control ration. Thus the 4% animal fat appeared to have no more feed value than that supplied by 4% oat mill by-product. This data is in marked contrast to the improved performance obtained from the feeding of unsaturated free fatty acids shown in the previous examples.

EXAMPLE 7

Two group of beef steers weighing approximately 960 pounds were placed on an experiment and fed for 138 days to test the value of adding 3% stabilized glycerides of animal fat to a complete ration for fattening steers. The ration was composed of dehydrated alfalfa meal, oat mill by-product and grain screenings as roughage sources, with grain, protein, and vitamin and mineral additions to provide the necessary supplements. The cattle were full-fed all they would consume throughout the experiment.

|  | Control | Experimental |
|---|---|---|
| Number of animals | 15 | 16 |
| Average initial wt., lbs | 966 | 964 |
| Average final wt., lbs | 1,280 | 1,255 |
| Average daily gain, lbs | 2.28 | 2.10 |
| Average daily feed intake, lbs | 30.73 | 28.30 |
| Feed per cwt. gain, lbs | 1,349 | 1,354 |

The cattle receiving the beef ration with 3% glycerides of animal fat gained at a slower rate and required as much feed as those receiving the control ration, even though this ration would have been higher in energy content when the 3% animal fat replaced the oat mill by-product. Again these data are in marked contrast to the significant improvement in rate and efficiency of gain obtained when feeding the unsaturated materials as shown in previous examples.

EXAMPLE 8

To illustrate the adverse effect of oxidation on the unsaturated materials, an experiment was conducted in which 3 groups of beef heifers were fed a control ration, the control ration plus ⅛ pound per head per day of unstabilized free fatty acids from soybean oil, and the control ration plus ⅛ pound free fatty acids from soybean oil stabilized with the addition of 300 p.p.m. butylated hydroxytoluene, 3000 p.p.m. santoquin, 100 p.p.m. citric acid and 500 p.p.m. phosphoric acid. The ration was composed of 3 pounds of a high-protein supplement fed with 5 pounds of cracked shelled corn and ground ear corn ad libitum. Both the stabilized and unstabilized fatty acids were stored approximately 2 months prior to use, thus affording adequate opportunity for oxidation to occur.

|  | Control | Experimental ⅛ # Unstabilized Soybean Fatty Acids | Experimental ⅛ # Stabilized Soybean Fatty Acids |
|---|---|---|---|
| No. of animals | 4 | 4 | 4 |
| Av. initial wt., lbs | 740 | 741 | 744 |
| Av. final wt., lbs | 913 | 921 | 944 |
| Av. daily gain, lbs | 2.31 | 2.41 | 2.66 |
| Av. daily feed intake, lbs | 21.78 | 22.67 | 23.47 |
| Feed per cwt. gain, lbs | 944 | 942 | 882 |
| I.V.U. intake per day | 0 |  | 56.7 |
| I.V.U. intake per lb. feed | 0 |  | 2.41 |

The heifers receiving the unstabilized free fatty acids from soybean oil gained only slightly faster than those receiving the control ration, whereas those receiving the stabilized unsaturated fatty acids from soybean oil showed a marked improvement in rate and efficiency of gain.

EXAMPLE 9

In a project similar to that described in Example 8 a group of 4 heifers was fed a ration providing ⅛ pound per head per day of unstabilized methyl esters of fish oil fatty acids, and a similar group was fed ⅛ pound of properly stabilized methyl esters of fish oil fatty acids. The performance of these groups were compared with a control group through a 75-day feeding period.

|  | Control | Experimental ⅛ # Unstabilized ME Fish Oil Fatty Acids | Experimental ⅛ # Stabilized ME Fish Oil Fatty Acids |
|---|---|---|---|
| No. of animals | 4 | 4 | 4 |
| Av. initial wt., lbs | 740 | 741 | 741 |
| Av. final wt., lbs | 913 | 914 | 930 |
| Av. daily gain, lbs | 2.31 | 2.31 | 2.03 |
| Av. daily feed intake, lbs | 21.78 | 21.59 | 22.33 |
| Feed per cwt. gain, lbs | 944 | 937 | 848 |
| I.V.U. intake per day | 0 |  | 99.3 |
| I.V.U. intake per lb. feed | 0 |  | 4.4 |

There was no improvement in average daily gain or efficiency of gain when the unstabilized methyl esters of fish oil fatty acids were fed. By contrast, the heifers receiving the properly stabilized methyl esters of fish oil fatty acids gained 0.32 pound per day faster and required 96 pounds less feed for each 100 pounds of gain than the control cattle.

EXAMPLE 10

Two groups of lactating dairy cows that had passed their peak of milk production were in their third month of lactation at the time they were placed on experiment. The cows in each group were fed 22 pounds of alfalfa hay per head per day and 14 pounds of a 16% protein dairy ration containing the following ingredients: ground corn, soybean meal, molasses, salt, defluorinated phosphate, vitamin A, vitamin D, manganous oxide, ferrous carbonate, cupric oxide, zinc oxide, cobalt carbonate, potassium iodide, magnesium oxide. The cows of the 2 groups were of comparable body weight, with the cows in Group A averaging 888 pounds and those in Group B 922 pounds. Group A received a 16% dairy ration to which soybean glycerides were added to supply 0.56 pound of added fat per cow per day. Group B received the 16% protein dairy feed containing free fatty acids of tall oil added in an amount to supply 0.56 pound per cow per day. The iodine value of the soybean glycerides was 126, and the iodine value of the free fatty acids of tall oil was 132. Thus the iodine value unit per pound of feed was 8.89 for the cows in Group A and 9.31 for the cows in Group B. The milk production obtained during the experimental period is expressed as a percent of the base period, the base period being the milk production for the week prior to the test and is expressed as 100%.

During period II the cows in group A were fed dairy ration containing in lieu of the soybean glycerides the glycerides of animal and vegetable fat in an amount to supply 0.8 pound of added fat per cow per day thus increasing the caloric intake. Group 8 received the basal 16% protein grain ration containing no added fat. The milk production results are shown below.

MILK PRODUCTION (PERCENT OF BASE PERIOD)

|  | Weeks on test | Group A | Group B |
|---|---|---|---|
| Period I | 1 | 98.6 | 101.0 |
|  | 2 | 97.1 | 106.6 |
|  | 3 | 92.7 | 106.7 |
|  | 4 | 92.6 | 97.5 |
| Period II | 5 | 89.9 | 90.1 |
|  | 6 | 84.6 | 84.5 |
|  | 7 | 82.7 | 81.3 |

Group A, soy glycerides replaced with 0.8 lb. glycerides of animal and vegetable fat.
Group B, received 16% protein grain feed without tall oil fatty acids
Average body weight of cows......................... 919    921

During period III the cows in both Groups A and B received the 16% protein basal grain ration with alfalfa hay to establish a base level of milk production. During period IV the cows in Group A received fresh free fatty acids of soybean oil in an amount to supply 0.56 pound per cow per day. The cows in Group B received the free fatty acids of tall oil in an amount to also supply 0.56 pound per cow per day. The iodine value units per pound of feed for cows in Group A were 8.89 and in Group B the iodine value units per pound of feed was 9.31. The milk production obtained in the following 7 weeks is shown below. In period V the cows in Group A were changed back to the base 16% protein grain ration containing no added free fatty acids of soybean oil. The cows in Group B continued to receive the free fatty acids of tall oil. The data obtained during this period is shown below.

Period III.—Three weeks

All cows continued to receive 16% protein grain feed to establish base.

Period IV.—Soybean fatty acids vs. tall oil fatty acids

|  | Group A | Group B |
|---|---|---|
| Average body weight of cows | 868 | 981 |
| Daily alfala hay (lbs.) | 22 | 22 |
| Daily 16% protein grain ration (lbs.) | 14 | 14 |
| Added fat to grain ration | 0.56 | 0.56 |
| Iodine value of fat | 126 | 132 |
| I.V.U. per cow per day | 320 | 335 |
| I.V.U. per lb. of total feed | 8.89 | 9.31 |
| Milk production (percent of base period), weeks on test: |  |  |
| 1 | 100.4 | 100.4 |
| 2 | 105.7 | 105.7 |
| 3 | 104.7 | 104.7 |
| 4 | 102.4 | 102.4 |
| 5 | 111.7 | 116.5 |
| 6 | 116.5 | 111.5 |
| 7 | 111.5 | 116.5 |

|  | Feed Change | No Feed Change |
|---|---|---|
| Period V, Group A changed to base feed without soybean fatty acids: |  |  |
| 8 | 106.7 | 112.8 |
| 9 | 104.0 | 116.0 |
| 10 | 95.0 | 111.4 |

From these data it is evident that the cows receiving the glycerides of animal or vegetable fat do not significantly respond with increased milk production, whereas cows receiving a comparable quantity of the free fatty acids of tall oil or soybean oil do show marked increases in milk production. When cows are changed from a ration supplying an adequate amount of unsaturated fatty acids to a ration containing either added glycerides of animal or vegetable fat or containing no added fat, they show an immediate and market drop in milk production. The improvement in milk production obtained from the feeding of the unsaturated fatty acids is greater than can be accounted for by the gross caloric value of such unsaturated free fatty acids.

EXAMPLE 11

Two groups of cows that had passed their peak level of milk production and had started their normal decline were placed on an experiment to determine the effect of feeding the unsaturated fatty acids of tall oil. The ration fed to both groups consisted of 15 pounds of alfalfa hay and 30 pounds of corn silage per head per day, plus 12 pounds of the appropriate 16% crude protein grain ration.

The above grain ration was formulated with the use of a 24% crude protein supplement which was mixed with corn and cob meal and ground oats. The ingredients used in the 24% protein supplement were: hominy feed, wheat middlings, soybean meal, molasses, salt (sodium chloride), limestone, defluorinated phosphate, urea, oat mill by-product, manganous oxide, ferrous carbonate, cupric oxide, zinc oxide, cobalt carbonate, potassium iodide, magnesium oxide. The cows in Group A were maintained on the control ration and those in Group B were placed on the control ration with an amount of free fatty acids of tall oil to supply 5.05 iodine value units per pound of total feed intake. The average daily milk production for the week prior to experiment for the cows in Group A was 37.1 and 36.2 pounds for the cows in Group B. The milk production results obtained during the 13-week experiment are expressed as a percent of the base period, with the base period being the milk production for the 2 weeks prior to the experiment, and is expressed as 100%. The milk production results are shown below.

DAILY INTAKE OF ACIDS

| I.V.U./lb. of grain | 0 | 24 |
|---|---|---|
|  | Percent of base milk production | |
| Period of test (weeks): |  |  |
| 0 | 100 | 100 |
| 1 | 100.2 | 108.9 |
| 2 | 99.2 | 111.3 |
| 3 | 96.1 | 112.9 |
| 4 | 98.7 | 110.4 |
| 5 | 97.3 | 109.5 |
| 6 | 96.3 | 111.3 |
| 7 | 94.4 | 109.3 |
| 8 | 92.5 | 110.6 |
| 9 | 90.5 | 109.4 |
| 10 | 80.9 | 110.9 |
| 11 | 96.5 | 107.6 |
| 12 | 86.3 | 100.3 |
| 13 | 84.8 | 108.1 |

The cows receiving the unsaturated fatty acids of tall oil showed a marked response in milk production.

EXAMPLE 12

Four groups of cows were placed on an experiment to evaluate the feeding of 4 different levels of unsaturated free fatty acids from soybean and cottonseed oil. The levels of unsaturated fatty acids used were in an amount to supply iodine value units per pound of grain ration of 0, 12, 24 and 34. The cows were fed alfalfa hay ad libitum, and the unsaturated material was included in the grain ration. The ingredient composition of the grain ration was as follows: crimped oats, flaked corn, molasses, soybean meal, linseed meal, wheat middlings, hominy feed, dehydrated alfalfa meal, defluorinated phosphate, salt (sodium chloride), vitamin D, manganous oxide, ferrous carbonate, cupric oxide, zinc oxide, cobalt carbonate, potassium iodide, magnesium oxide.

Period I

Alfalfa hay was fed ad libitum to all cows. A dairy feed containing 16% crude protein with 0, 3, 5 and 7% soybean and cottonseed fatty acid mixture (stabilized with 200 p.p.m. butylated hydroxytoluene) addition was fed to lactating dairy cows. After a basic preliminary feeding period, the cows were changed from the basic grain ration to the experimental grain ration as shown. Control cows received the same basic ration without fatty acids mixed in the feed. The milk production expressed as a percent of the base period for the 11-week experimental period of barn feeding is shown below.

MILK PRODUCTION (PERCENT OF BASIC PERIOD)

| Weeks on test: | Iodine value units/lb. of grain | | | |
|---|---|---|---|---|
| | 0 | 12 | 24 | 34 |
| 1 | 100.5 | 105.1 | 105.7 | 98.9 |
| 2 | 101.1 | 106.5 | 103.5 | 99.9 |
| 3 | 99.7 | 107.4 | 102.9 | 105.9 |
| 4 | 97.7 | 108.3 | 104.6 | 100.2 |
| 5 | 97.5 | 112.8 | 115.0 | 104.7 |
| 6 | 97.9 | 115.2 | 112.0 | 106.0 |
| 7 | 95.1 | 113.5 | 111.8 | 112.2 |
| 8 | 92.1 | 118.5 | 112.6 | 109.1 |
| 9 | 89.2 | 114.0 | 112.6 | 114.1 |
| 10 | 91.4 | 109.7 | 103.7 | 112.8 |
| 11 | 90.3 | 115.0 | 109.7 | 117.3 |

At the end of 11 weeks, the cows receiving no added iodine value units from unsaturated fatty acids of soybean and cottonseed oils were producing only 90% of base milk production whereas the cows receiving the 12, 24 and 34 added iodine value units of unsaturated free fatty acids per pound of grain ration were producing at 115%, 109.7% and 117.3% of the base milk production respectively.

Following 11 weeks of barn feeding, the cows in the 4 groups were turned to pasture and continued to receive the same experimental grain rations. The milk production obtained is expressed as a percent of the original base period and is shown below.

Period II.—Five weeks

Cows were turned to pasture

| Weeks on test: | 0 | 12 | 24 | 34 |
|---|---|---|---|---|
| 12 | 101.6 | 124.4 | 119.8 | 124.5 |
| 13 | 104.2 | 128.0 | 129.4 | 128.4 |
| 14 | 104.9 | 129.8 | 129.6 | 122.9 |
| 15 | 99.1 | 123.2 | 126.4 | 119.7 |
| 16 | 84.8 | 121.5 | 121.6 | 123.2 |

The cows in all 4 groups showed a significant increase in milk production upon being turned to pasture, but the difference in milk production between the cows receiving the added iodine value units from unsaturated free fatty acids of soybean and cottonseed oil was significantly better than the production of control cows.

EXAMPLE 13

Two groups of cows in their sixth and seventh month of lactation were placed on experimental rations to which the stabilized unsaturated free fatty acids of linseed oil or soybean oil were added. The cows were fed 15 pounds of alfalfa hay, 30 pounds of corn silage and 10 pounds of a 16% protein grain ration per day of the following composition: ground corn, soybean meal, molasses, salt, defluorinated phosphate, manganous oxide, ferrous carbonate, cupric oxide, zinc oxide, cobalt carbonate, potassium iodide, magnesium oxide.

The unsaturated free fatty acids of linseed oil were added in a quantity to supply 5.04 iodine value units per pound of total feed for Group A. The cows in Group B receiving the unsaturated free fatty acids of soybean oil received 5.2 iodine value units per pound of feed. The milk production as a percent of the base period and the butterfat test obtained during the experimental period are shown below.

MILK PRODUCTION (PERCENT OF BASE)

| | Group A | | Group B | |
|---|---|---|---|---|
| | | Butterfat, percent | | Butterfat, percent |
| Test Period: | | | | |
| Pre-test | 100 | 4.0 | 100 | 4.1 |
| 1 | 103 | 4.0 | 104 | 3.8 |
| 2 | 104 | 4.1 | 111 | 3.9 |
| 3 | 104 | 4.4 | 108 | 3.9 |
| 4 | 99 | 4.6 | 106 | 4.4 |
| 5 | 103 | 4.5 | 104 | 4.5 |
| 6 | 99 | 4.0 | 110 | 4.3 |
| 7 | 101 | 4.8 | 107 | 4.4 |
| 8 | 102 | 4.2 | 108 | 3.9 |
| 9 | 105 | 4.8 | 110 | 4.2 |
| 10 | 103 | 4.3 | 112 | 4.0 |
| Post 1 | 99 | 3.9 | 100 | 3.7 |
| Post 2 | 97 | 4.4 | 95 | 3.6 |
| Post 3 | 89 | 4.1 | 93 | 3.7 |

The cows in Groups A and B showed an increase in milk production during the 10-week experimental period in spite of the fact that they were in their sixth and seventh month of lactation at the time they were placed on experiment. Following the removal of the free fatty acids of linseed or soybean oil from the grain ration, the cows showed a marked decline in milk production during the following 3 weeks. Butterfat test was maintained throughout the period of feeding of the unsaturated materials.

EXAMPLE 14

To compare the feeding of fish oil glycerides with the feeding of alcohol esters of fish oil, 2 cows were placed on an experiment. Both cows received 26 pounds of alfalfa hay per day and received a 16% protein basic dairy ration of the same composition as was used in Example 13. During period I cows A and B received 0.43 pound per day of fish oil glycerides. The milk production expressed as a percent of the base period and butterfat test is shown below. The decrease in milk production and decline in butterfat test is quite comparable to all data published in scientific journals.

Period I.—Fish oil glycerides

| | Cow A | Cow B |
|---|---|---|
| Daily alfalfa hay (lbs.) | 26 | 26 |
| 16% protein dairy feed (lbs.) | 10 | 10 |
| Fish oil (lbs.) | 0.43 | 0.43 |
| Iodine value of fish oil glyceride | 180 | 180 |

MILK PRODUCTION (PERCENT OF BASE PERIOD)

| | | Fat, percent | | Fat, percent |
|---|---|---|---|---|
| Weeks on test: | | | | |
| Pre-test | 100 | 3.2 | 100 | 3.9 |
| 1 | 99 | 3.4 | 98 | 3.3 |
| 2 | 95 | 3.4 | 93 | 3.9 |
| 3 | 85 | 3.3 | 83 | 3.7 |
| 4 | 82 | 2.4 | 79 | 3.6 |

During period II cows A and B were fed the 16% dairy feed to which was added the ethyl or methyl ester of menhaden fish oil fatty acids stabilized with the antioxidant santoquin and phosphoric acid. Cow A received 0.39 pound per day of the ethyl ester, and cow B received 0.39 pound per day of the methyl ester. The added iodine value units per pound of total feed for each cow, A and B, was 8.6. The milk production expressed as a percent of the base period for the 6 weeks of the experimental period is shown below.

Period II.—Alkyl esters of fish oil

Replacing the fish oil glycerides with menhaden alkyl esters stabilized with santoquin and phosphoric acid.

|  | Cow A | Cow B |
|---|---|---|
| Daily alfalfa hay (lbs.) | 26 | 26 |
| 16% protein dairy feed | 10 | 10 |
| Ethyl ester per day (lbs.) | 0.39 |  |
| Methyl ester per day (lbs.) |  | 0.39 |
| Iodine value of fat | 180 | 180 |
| I.V.U. per cow per day | 308 | 308 |
| I.V.U. per lb. total feed | 8.6 | 8.6 |

MILK PRODUCTION (PERCENT OF BASE PERIOD)

|  |  | Fat, percent |  | Fat, percent |
|---|---|---|---|---|
| Weeks on test: |  |  |  |  |
| Pre-test | 100 | 2.4 | 100 | 3.6 |
| 1 | 114 | 3.0 | 106 | 3.9 |
| 2 | 121 | 3.1 | 113 | 3.7 |
| 3 | 117 | 3.4 | 105 | 3.7 |
| 4 | 113 | 3.9 | 102 | 4.0 |
| 5 | 112 | 3.8 | 104 | 3.6 |
| 6 | 111 | 3.9 | 116 | 3.8 |

When the cows received the ethyl or methyl esters of the free fatty acids of menhaden fish oil, they showed a significant increase in milk production, with a maintenance or increase in butterfat test which was in marked contrast to the results obtained when the fish oil glycerides were fed.

EXAMPLE 15

A special production of the methyl esters of the more unsaturated free fatty acids of fish oil was prepared and stabilized with santoquin and phosphoric acid. The composition of the methyl esters produced was as follows:

|  | Percent |
|---|---|
| Saturated esters | 6 |
| Monoethenoid esters | 16.9 |
| Pentaethenoid esters | 38.0 |
| Hexaethenoid esters | 39.1 |

The iodine value of this special preparation was 254. These specially prepared esters were then fed to a cow for a 5-week experimental period. The cow received 22 pounds of alfalfa hay per day and a 16% protein dairy ration to which the specially prepared methyl esters were added in an amount to supply 0.21 pound per day when 14 pounds of the 16% dairy ration were fed. This provided a total added iodine value unit intake of 6.7 per pound of total feed. The milk production expressed as a percent of the base period is shown below.

| Daily alfalfa hay (lbs.) | 22 |
|---|---|
| 16% protein dairy feed (lbs.) | 14 |
| Added fat to grain ration (lbs.) | 0.21 |
| Iodine value of fat | 254 |
| I.V.U. per cow per day | 241 |
| I.V.U. per lb. total feed | 6.7 |

MILK PRODUCTION (PERCENT OF BASE PERIOD)

|  |  | Fat, percent |
|---|---|---|
| Weeks of test: |  |  |
| Pre-test | 100 | 3.8 |
| 1 | 90 | 4.1 |
| 2 | 110 | 3.4 |
| 3 | 107 | 3.7 |
| 4 | 112 | 3.9 |
| 5 | 114 | 4.3 |
| Post 1 | 110 | 4.3 |
| Post 2 | 88 | 4.3 |

The cow showed a marked increase in milk production, producing 14% more milk after 5 weeks on test than during the base period. Following removal of the methyl esters from the ration the cow showed a marked drop in milk production within 2 weeks, producing only 88% of the milk production of the base period compared with a high of 114% of the base period after 5 weeks on methyl ester material.

The saturated acids remaining from the production of the highly unsaturated methyl esters above containing some monethenoid fatty acids were fed to a dairy cow. This cow was receiving a ration of 25 pounds of alfalfa hay per day and 15 pounds of a 16% protein dairy feed to which the saturated fraction of the fish oil was added in a quantity to supply 0.45 pound intake per cow per day. The milk production expressed as a percent of the base period is shown below. The cow receiving the more highly saturated fraction of fish oil continued to decline in milk production in contrast to the marked improvement in milk production shown from the feeding of the highly unsaturated methyl esters of fish oil fatty acids.

Feeding remaining saturated acids containing some monoethenoid fatty acids to dairy cow.

| Daily alfalfa hay (lbs.) | 25 |
|---|---|
| 16% protein dairy feed (lbs.) | 15 |
| Added fat to grain ration (lbs.) | 0.45 |

MILK PRODUCTION (PERCENT OF BASE PERIOD)

|  |  | Fat, percent |
|---|---|---|
| Weeks of test: |  |  |
| Pre-test | 100 | 4.2 |
| 1 | 95 | 4.2 |
| 2 | 91 | 3.9 |

EXAMPLE 16

A concentrate of oleic acid of the following composition:

|  | Percent |
|---|---|
| Oleic | 79.5 |
| Palmitoleic | 6.5 |
| Myristoleic | 1.5 |
| Linoleic | 4.0 |
| Linolenic | 1.0 |
| Saturated fatty acids | 7.5 | was fed to a lactating dairy cow during a 4-week experimental period. The cow was receiving a diet of 25 pounds of alfalfa hay and 15 pounds of a 16% protein grain ration to which the oleic acid mixture was added in an amount to supply 0.75 pound intake per cow per day. The iodine value of the oleic acid mixture was 88. The oleic acid mixture was relatively freshly prepared and was not stabilized against oxidation by means of oxidation retardants. The milk production expressed as a percent of the base period is shown below.

| Alfalfa hay daily (lbs.) | 25 |
|---|---|
| 16% protein grain (lbs.) | 15 |
| Added fat to grain ration (lbs.) | 0.75 |
| Iodine value of fat | 88 |

MILK PRODUCTION (PERCENT OF BASE PERIOD)

|  |  | Fat, percent |
|---|---|---|
| Weeks of test: |  |  |
| Pre-test | 100 | 4.1 |
| 1 | 103 | 4.1 |
| 2 | 101 | 4.1 |
| 3 | 102 | 4.0 |
| 4 | 101 | 4.1 |
| Post 1 | 98 | 4.1 |
| Post 2 | 97 | 4.0 |

The lactating cow during this 4-week experimental period showed an increase in milk production in contrast to the normal expected 6 to 9% decline in production that one would anticipate during this period.

EXAMPLE 17

To investigate the use of the alcohol of unsaturated fatty acids, an alcohol composed of 20% oleyl, 15% linoleyl, 50% linolenyl and 15% saturated alcohol, with an iodine value of 180, was given to two dairy cows by oral drench. The cows were fed 24 pounds alfalfa hay per head daily and received 12 pounds of the same 16% protein grain ration as in Example 12. The cows were drenched with 513 iodine value units per cow per day. The milk production and the butterfat test for the day prior to the test and the 3-day period of drenching was as follows:

| Feed consumed daily | Cow 1 | Cow 2 |
|---|---|---|
| Alfalfa hay (lbs.) | 24 | 24 |
| Grain (lbs.) | 12 | 12 |
| I.V.U. per lb. feed | 14.3 | 14.3 |
| I.V.U. per lb. grain | 42.7 | 42.7 |
| I.V.U. per cow per day | 513 | 513 |

|  | Cow 1 | | Cow 2 | |
|---|---|---|---|---|
|  | Lbs., milk | Percent butterfat | Lbs., milk | Percent butterfat |
| Test period (days:) | | | | |
| Prior test | 38.9 | 3.2 | 33.7 | 3.5 |
| 1 | 38.8 | 3.7 | 33.2 | 4.0 |
| 2 | 39.5 | 3.8 | 32.1 | 3.9 |
| 3 | 40.8 | 3.6 | 33.4 | 4.0 |

Milk production and butterfat test were maintained or increased with the drenching of the unsaturated alcohols.

EXAMPLE 18

Six lots of dairy cattle in their fourth month of lactation were fed a grain mix and alfalfa hay. Energy intake per cow was maintained throughout the feeding period by weighing grain and hay for each cow daily. The grain ration was a ground corn, soybean meal formula with the necessary minerals and vitamins to provide a balanced ration. The grain ration fed to 5 of the lots of dairy cows had admixed therewith a mixture of stabilized free fatty acids. Such fatty acids had been produced by hydrolysis of soybean oil and stabilized with butylated hydroxytoluene, santoquin and citric acid. The grain ration was formulated to supply increasing levels of soybean free fatty acids which are equated on an I.V.U. basis. The average weekly milk production is expressed as percent of base milk production of the previous 2 weeks.

DAILY INTAKE OF FATTY ACID (I.V.U.)

| | | | | | | |
|---|---|---|---|---|---|---|
| Total feed | 37 | 36 | 36 | 37 | 39 | 34 |
| I.V.U. per day | 0 | 45 | 97 | 139 | 229 | 629 |
| Fatty acids (lbs.) | 0 | 0.08 | 0.17 | 0.24 | 0.4 | 1.1 |
| I.V.U. per lb. feed | 0 | 1.25 | 2.7 | 3.75 | 5.87 | 18.5 |

| | Weekly milk production percent of base period | | | | | |
|---|---|---|---|---|---|---|
| Test period: | | | | | | |
| Pre-test | 100 | 100 | 100 | 100 | 100 | 100 |
| 1 | 97 | 97 | 104 | 106 | 99 | 99 |
| 2 | 95 | 102 | 107 | 114 | 106 | 112 |
| 3 | 97 | 104 | 106 | 113 | 106 | 113 |
| 4 | 94 | 101 | 105 | 114 | 105 | 115 |
| 5 | 89 | 98 | 101 | 112 | 107 | 114 |
| 6 | 85 | 97 | 100 | 110 | 109 | 113 |
| 7 | 86 | 98 | 102 | 110 | 110 | 112 |

At the end of 7 weeks of feeding, the cows receiving the stabilized free fatty acids produced a greater amount of milk than was produced by the control cows. The decline in production of the control cows is comparable to expected decline in milk production. The addition of such acids to the diet results in increased lactation. The increase in lactation during the fifth month of lactation is quite contrary to data reported from feeding trials in the literature.

EXAMPLE 19

Five lots of lambs having an initial feedlot weight of about 80 pounds were fed a pelleted feed in conventional amounts over a 50-day feeding period. The pelleted feed was composed of: alfalfa meal, ground corn, molasses, soybean meal, linseed meal, oat mill by-product, urea, defluorinated phosphate, limestone, salt, vitamin A, vitamin D, vitamin E, Stilbosol (a commercial preparation of stilbestrol), antibiotic (aureomycin), manganous oxide, ferrous carbonate, cupric oxide, zinc oxide, cobalt carbonate, potassium iodide, magnesium oxide. The lambs received one-half pound of alfalfa hay per day in addition to the pelleted feed. The pelleted feed fed to 5 lots of lambs had incorporated therewith a mixture of unsaturated acids (6.5% palmitic, 4.2% stearic, 28.7% oleic, 52.6% linoleic, 8% linolenic) in sufficient amounts to provide a daily intake ranging from 1.8 to 28.2 iodine value units of such free unsaturated acids per pound of total feed. The same basal ration exclusive of the unsaturated fatty acids was fed to the control groups of lambs. Four groups of lambs served as control groups. The average daily weight gain and feed required to provide the weight gain as well as carcass grade were:

LAMB FEEDING TEST.—EFFECT OF SOYBEAN FATTY ACIDS ON PERFORMANCE OF FATTENING LAMBS (50 DAYS)

| | Ave. initial wt., lbs. | Ave. final wt., lbs. | Ave. daily gain, lbs. | Ave. daily feed, lbs. | Feed per cwt. gain | Total added I.V.U., units | I.V.U./ lb., feed | Carcass grade |
|---|---|---|---|---|---|---|---|---|
| No. of animals: | | | | | | | | |
| 15 | 80.70 | 108.75 | .561 | 4.23 | 755 | | | 2.05 |
| 15 | 80.74 | 118.11 | .747 | 4.96 | 664 | 8.8 | 1.8 | 1.81 |
| 15 | 80.77 | 116.98 | .724 | 4.69 | 648 | 17.6 | 3.7 | 1.82 |
| 29 | 80.73 | 114.90 | .683 | 4.70 | 687 | 35.3 | 7.5 | 1.75 |
| 29 | 80.51 | 117.43 | .738 | 4.75 | 643 | 70.6 | 14.9 | 1.75 |
| 15 | 80.77 | 107.86 | .542 | 4.14 | 765 | 115.9 | 28.2 | 2.30 |

As seen from the above data, feeding of the unsaturated acids in amounts to provide as little as 1.8 added iodine value units per pound of total feed resulted in significant improvement in average daily weight gain, efficiency of feed utilization and carcass grade.

EXAMPLE 20

In an experiment designed to determine the effect of adding the unsaturated compounds to diets containing varying proportions of roughage and grain, a pelleted formula composed of approximately 50% roughage and 50% concentrate ingredients was fed with two levels of shelled corn. One-third pound of hay was also fed daily to each animal. The unsaturated compounds fed comprised a mixture of unsaturated fatty acids from tall oil (53% oleic, 47% linoleic).

EFFECT OF ADDITION OF TALL OIL FATTY ACIDS TO RATIONS FOR FATTENING LAMBS (56 DAYS)

|  | Ration A, control with 25% added corn | Ration A, plus tall oil fatty acids | Ration B, control with 50% added corn | Ration B, plus tall oil fatty acids |
|---|---|---|---|---|
| No. of lambs | 15 | 30 | 30 | 29 |
| Av. initial wt., lbs | 61.6 | 62.0 | 61.9 | 62.3 |
| Av. final wt., lbs | 88.9 | 89.3 | 89.3 | 92.4 |
| Av. daily gain, lbs | .49 | .49 | .49 | .54 |
| Av. daily feed, lbs | 4.57 | 3.87 | 3.96 | 3.85 |
| Feed per cwt. gain, lbs | 939 | 794 | 809 | 717 |
| Iodine value units intake per day |  | 94.6 |  | 72.5 |
| I.V.I. per lb. feed |  | 24.4 |  | 18.8 |

It can be observed that the addition of unsaturated fatty acids to the 25% corn diet increased feed efficiency by 15% and 145 pounds less feed were required to produce a hundred pounds of gain. When 18.8 iodide value units of unsaturated fatty acids per pound of feed were added to the daily diet of 50% corn, a significant increase in rate of gain was obtained, with an 11% improvement in feed utilization efficiency. It is to be noted also that a greater efficiency of gain was obtained in the case of the lambs receiving 24.4 iodine value units of unsaturated acids per pound of feed and the 25% corn diet than was obtained with the lambs receiving the 50% corn diet without unsaturated acids.

EXAMPLE 21

The inclusion of the unsaturated free fatty acids of soybean and cottonseed free fatty acids (29.7% saturated acids, 24.1% oleic, 41.9% linoleic and 4.4% linolenic) in the diet of lambs weighing 81 pounds at the start of a 57-day feeding period afforded a 20% increase in rate of weight gain and required 105 pounds less feed to produce a hundred pounds of gain. The unsaturated acids were stabilized with butylated hydroxytoluene. Thus, when the stabilized unsaturated materials are fed in sufficient quantity, an improvement in rate of weight gain and feed efficiency can be obtained.

LAMB FATTENING TEST (57 DAYS) EFFECT OF SOYBEAN AND COTTONSEED FREE FATTY ACIDS ON LAMB PERFORMANCE

|  | Control | Control feed plus unsaturated acids per day |
|---|---|---|
| No. of lambs | 15 | 29 |
| Av. initial wt., lbs | 81 | 82 |
| Av. final wt., lbs | 109 | 118 |
| Av. daily gain, lbs | 0.51 | 0.60 |
| Ave. daily feed intake, lbs | 4.03 | 4.09 |
| Feed per cwt. gain, lbs | 791 | 686 |
| Total iodine value unit intake per day |  | 28.9 |
| Iodine value unit per lb. feed |  | 7.1 |

From the foregoing it is readily seen that by means of the present invention it is possible to accelerate the rate of weight gain of growing and/or fattening meat-producing ruminant animals. The invention is applicable to all ruminant animals. When the specific unsaturated materials are fed in proper amounts to the ruminant animals the weight gain is accelerated and the efficiency of feed utilization significantly improved as well as carcass grade of the animal. Thus by means of the present invention meat-producing ruminants can be grown at a more rapid rate and can be matured earlier. For the growing and fattening meat-producing animals earlier marketing and an improved carcass grade can be obtained. When the specific unsaturated materials are fed in proper amounts to lactating dairy cattle, milk production is increased and sustained throughout the lactation period of the cow. Moreover, the present invention makes it possible to maintain or increase the butterfat content of the milk produced.

A further advantage of the present invention resides in the use of the specified unsaturated materials as a drench for ruminants such as lactating dairy cows exhibiting lack of appetite in connection with the nutritional syndrome ketosis or acetonemia. In such applications dosage levels on the order of about 200 to 500 or more iodine value units per 24 hours are employed, depending upon the size and condition of the animal. For example, for a lactating dairy cow ranging in weight from about 700 to 1000 pounds the dosage level of the drench may range from 100 grams to about 800 grams of the unsaturated materials per 24 hours and is preferably administered in a plurality of smaller dosages.

Throughout this application and in accordance with the art knowledge, by a ruminant animal is meant an animal possessing a compound stomach consisting of four compartments, namely, rumen, reticulum, omasum and abomasum, and in which the rumen is functional due to the ingestion of feed materials capable of inducing rumination.

Those modifications and equivalents which fall within the spirit of the invention and the scope of the appended claims are to be considered part of the invention.

We claim:

1. A method of feeding a lactating dairy cow to improve milk production thereof which comprises orally administering to the cow a substantially non-oxidized unsaturated material in non-glyceride form selected from the group consisting of unsaturated free fatty acids having from 14 to 24 carbon atoms in the molecule, hydrolyzed animal unsaturated fats, hydrolyzed marine oils, hydrolyzed plant oils, alcohols derived from unsaturated fatty acids having from 14 to 24 carbon atoms in the molecule, lower alkyl esters of unsaturated fatty acids having from 14 to 24 carbon atoms in the molecule, and a mixture of the foregoing named unsaturated compounds, the amount of said unsaturated material fed being sufficient to provide from about 0.7 to about 24.4 iodine value units per pound of total feed fed to the cow.

2. A process for treating a lactating dairy cow to improve appetite thereof which comprises drenching said lactating dairy cow with about 100 grams to about 800 grams per 24 hours of a substantially non-oxidized unsaturated material in non-glyceride form selected from the group consisting of unsaturated free fatty acids having from 14 to 24 carbon atoms in the molecule, hydrolyzed animal unsaturated fats, hydrolyzed marine oils, hydrolyzed plant oils, alcohols derived from unsaturated fatty acids having from 14 to 24 carbon atoms in the molecule, lower alkyl esters of unsaturated fatty acids having from 14 to 24 carbon atoms in the molecule, and a mixture of the foregoing named unsaturated compounds.

References Cited

UNITED STATES PATENTS

| | | | |
|---|---|---|---|
| 1,958,295 | 5/1954 | Christensen et al. | 99—2 |
| 2,835,584 | 5/1958 | Rosenberg | 99—2 |
| 2,875,060 | 2/1959 | Holman | 99—2 |
| 2,899,307 | 8/1959 | Wilson | 99—2 |
| 2,928,737 | 3/1960 | Fincher | 99—2 |
| 3,010,977 | 11/1961 | Eaves et al. | |
| 3,011,892 | 12/1961 | Rosenberg | 99—2 |
| 3,117,866 | 1/1964 | Golub et al. | 99—2 |

FOREIGN PATENTS 852,189  10/1960  Great Britain.

OTHER REFERENCES

Lambert et al.: "Lipid Deficiency in the Calf," J. Nutrition, vol. 52, pages 259–269, Feb. 10, 1954.

Morrison: Feeds and Feeding, pp. 1083–84, The Morrison Publishing Co., Ithaca, N.Y. (1957). P.O.S.L. SF 95M68 1956.

Ault et al: "Utilization of Fats in Poultry and Other Livestock Feeds," Utilization Research report No. 2, U.S. Dept. of Agriculture, August 1960.

A. LOUIS MONACELL, Primary Examiner

J. M. HUNTER, Assistant Examiner

U.S. Cl. X.R.

99—2; 424—107, 195, 314, 318, 343

UNITED STATES PATENT OFFICE
CERTIFICATE OF CORRECTION

Patent No. 3,458,625　　　　　　　　　　　　　　　　　　　　July 29, 1969

William L. Ensor et al.

It is certified that error appears in the above identified patent and that said Letters Patent are hereby corrected as shown below:

Column 9, line 20, "Group 8" should read -- Group B --. Column 10, line 9 "market" should read -- marked --; same column 10, in the Table, No. 10, in the first column under the heading "Percent of base milk production", "80.9" should read -- 89.9 --; same Table, No. 11, in the first column under the heading "Percent of base milk production", "96.5" should read -- 86.5 --. Column 17, in the last line of the first Table, "I.V.I." should read -- I.V.U. --; line 34, "iodide" should read -- iodine --. Column 19, line 13, "Eaves et al." should read -- Eaves et al. ------- 99-2 --; after line 15, add 3,186,909　　　　　　6/1965　　　　　McMurtry et al------- 99-2

Signed and sealed this 24th day of March 1970.

(SEAL)
Attest:

EDWARD M. FLETCHER, JR.　　　　　　　　　　　　　　　WILLIAM E. SCHUYLER, JR.
Attesting Officer　　　　　　　　　　　　　　　　　　Commissioner of Patents